US011272394B2

(12) United States Patent
Panchal et al.

(10) Patent No.: US 11,272,394 B2
(45) Date of Patent: *Mar. 8, 2022

(54) DIVERSIFIED RAN ARCHITECTURE WITH CONGESTION CONTROL BASED ON SPECTRUM RE-ALLOCATION

(71) Applicant: Verizon Patent and Licensing Inc., Basking Ridge, NJ (US)

(72) Inventors: Jignesh S. Panchal, Hillsborough, NJ (US); Kalyani Bogineni, Hillsborough, NJ (US); Yuexin Dong, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/924,675

(22) Filed: Jul. 9, 2020

(65) Prior Publication Data
US 2020/0344642 A1 Oct. 29, 2020

Related U.S. Application Data

(63) Continuation of application No. 16/140,617, filed on Sep. 25, 2018, now Pat. No. 10,743,211.

(51) Int. Cl.
*H04W 28/02* (2009.01)
*H04W 48/18* (2009.01)
*H04W 36/14* (2009.01)
*H04W 8/02* (2009.01)
*H04W 72/04* (2009.01)
(Continued)

(52) U.S. Cl.
CPC ......... *H04W 28/0289* (2013.01); *H04W 8/02* (2013.01); *H04W 36/14* (2013.01); *H04W 48/18* (2013.01); *H04W 72/0453* (2013.01); *H04W 28/16* (2013.01); *H04W 88/085* (2013.01)

(58) Field of Classification Search
CPC ............... H04L 41/0896; H04L 41/147; H04L 43/0876; H04L 47/11; H04L 47/12; H04L 47/122; H04L 47/127; H04L 47/14; H04L 47/20; H04W 24/02; H04W 24/10; H04W 28/0289; H04W 28/16; H04W 48/18
See application file for complete search history.

(56) References Cited

U.S. PATENT DOCUMENTS

2014/0206377 A1* 7/2014 Priotti .................. H04W 16/14
455/454
2015/0092544 A1* 4/2015 De Pasquale ......... H04W 16/14
370/230
(Continued)

OTHER PUBLICATIONS

Bakker, et al., "RAN architecture components—final report", Jul. 27, 2017 5G NORMA WP4 (Year 2017).
(Continued)

*Primary Examiner* — Gary Mui

(57) ABSTRACT

A method, a system, and a non-transitory computer-readable storage medium are described in which a congestion control service is provided. The congestion control service provides for congestion detection and management in relation to a diversified radio access network. The congestion control service includes using a radio spectrum re-allocation mechanism pertaining to different radio access technologies of the diversified radio access network to mitigation detected congestion.

20 Claims, 13 Drawing Sheets

(51) Int. Cl.
   *H04W 28/16*    (2009.01)
   *H04W 88/08*    (2009.01)

(56) References Cited

U.S. PATENT DOCUMENTS

| | | |
|---|---|---|
| 2018/0006954 A1 | 1/2018 | Arora et al. |
| 2018/0123961 A1 | 5/2018 | Farmanbar et al. |
| 2018/0176143 A1 | 6/2018 | Cui et al. |
| 2018/0191636 A1 | 7/2018 | Wang |
| 2018/0234916 A1 | 8/2018 | Song et al. |
| 2018/0255605 A1 | 9/2018 | Yu et al. |
| 2019/0075552 A1 | 3/2019 | Yu et al. |
| 2019/0166518 A1 | 5/2019 | Arora et al. |
| 2019/0254090 A1 | 8/2019 | Yang et al. |
| 2019/0281494 A1 | 9/2019 | Chan et al. |
| 2019/0357264 A1* | 11/2019 | Yi .................... H04L 5/001 |
| 2019/0394790 A1* | 12/2019 | Damnjanovic ... H04W 72/0446 |
| 2020/0084797 A1* | 3/2020 | Marjelund ............ H04W 72/14 |

OTHER PUBLICATIONS

Rodriguez, "Distributed Congnitve RAT Selection in 5G Heterogeneous Networks: A Machine Learning Approach", Mar. 25, 2016 (Year: 2016).

\* cited by examiner

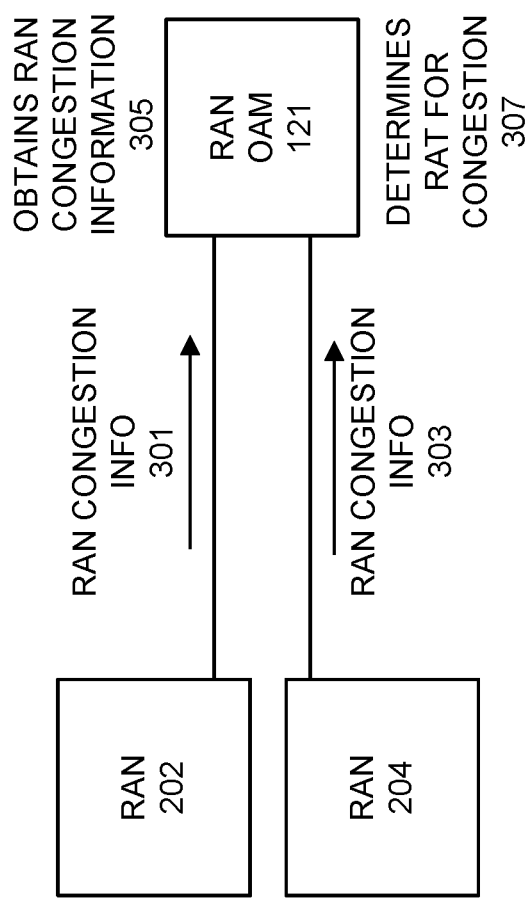

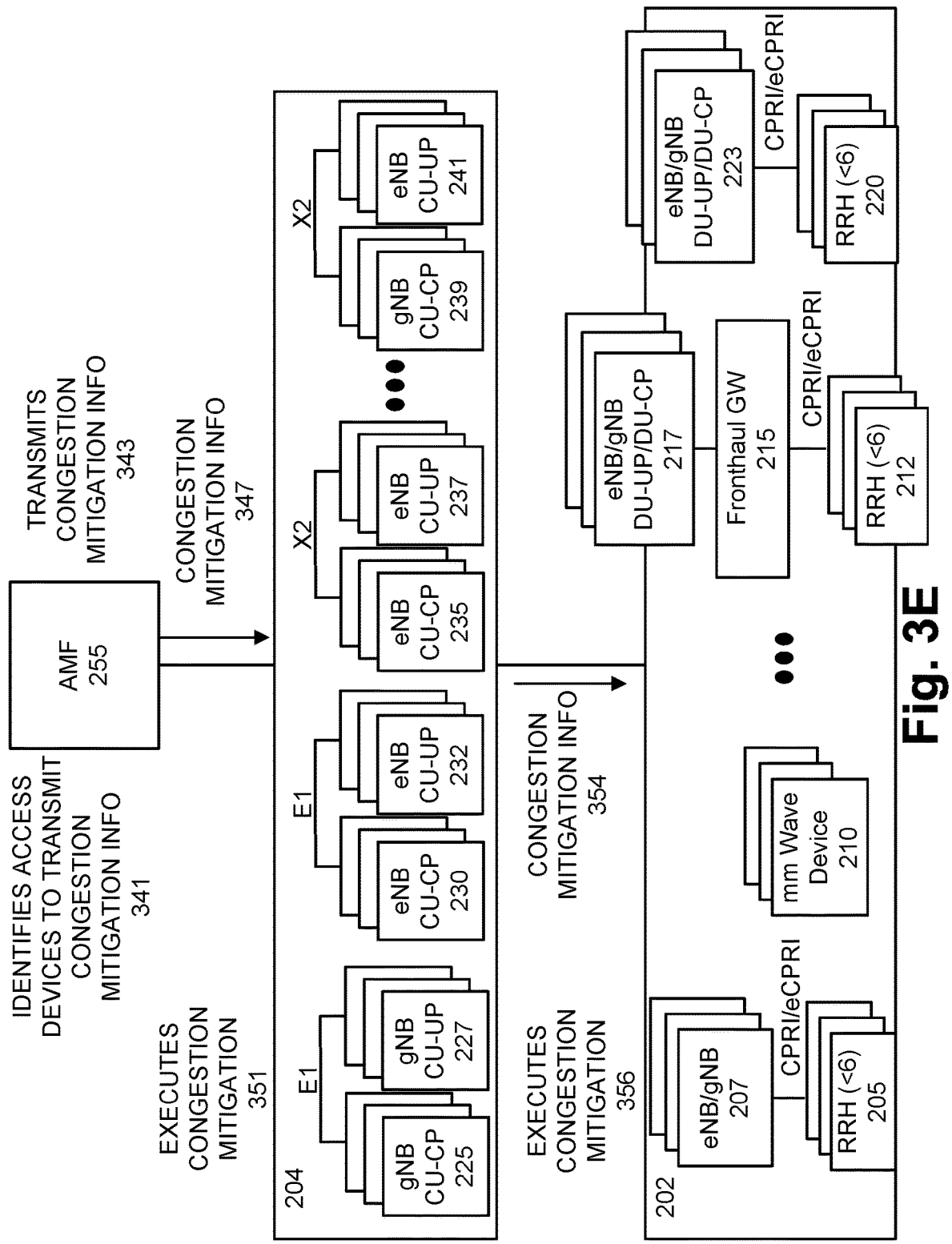

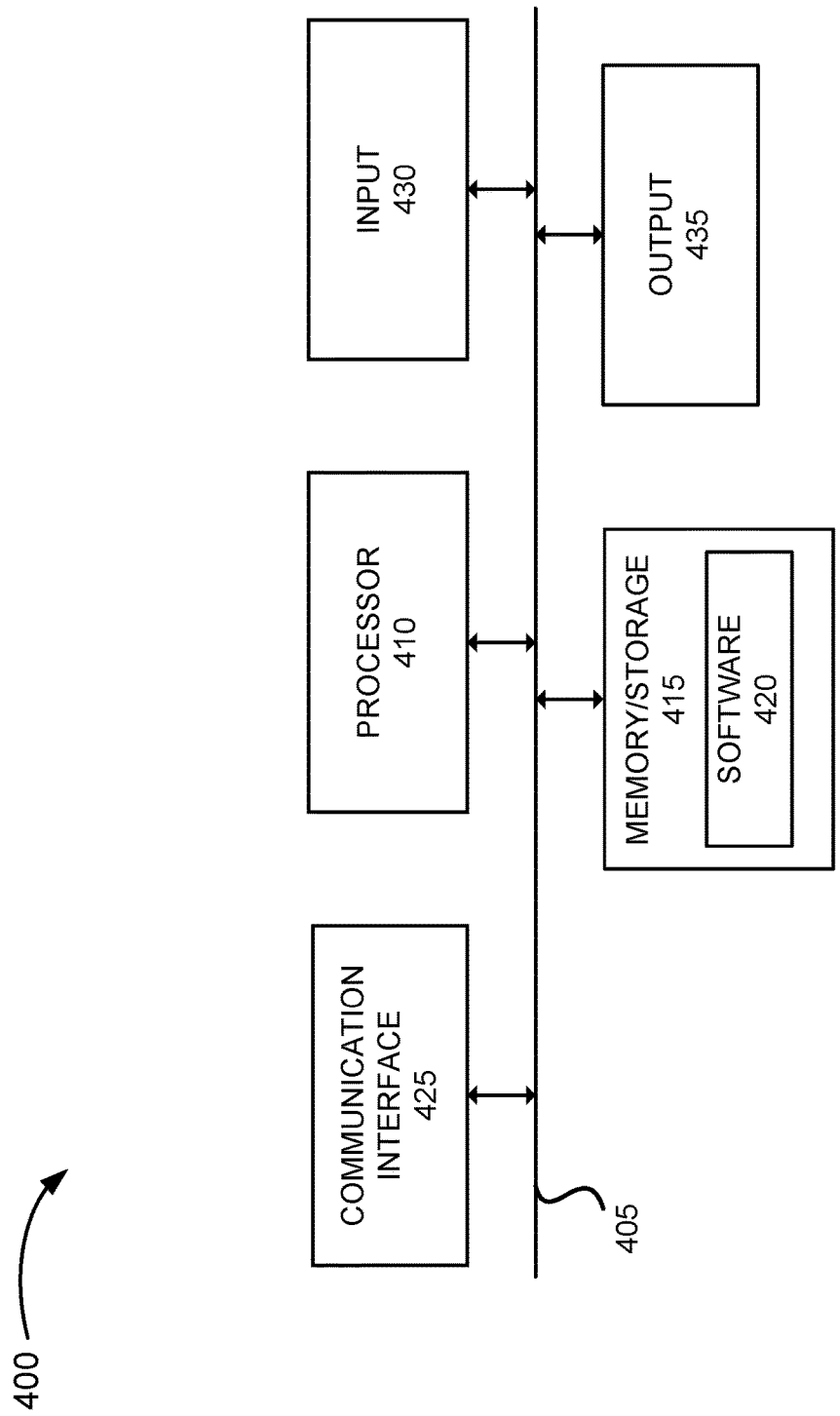

DIVERSIFIED RAN ARCHITECTURE WITH CONGESTION CONTROL BASED ON SPECTRUM RE-ALLOCATION

CROSS REFERENCE TO RELATED APPLICATION

This patent application claims priority to and is a continuation of U.S. patent application Ser. No. 16/140,617, filed on Sep. 25, 2018, the disclosure of which is incorporated by reference herein in its entirety.

BACKGROUND

The development and design of future wireless networks (e.g., Fifth Generation (5G) networks, etc.) is currently underway by various organizations, service providers, and so forth. For example, the development and design of future wireless networks may be based on cloud technologies, software defined networking (SDN), and network function virtualization (NFV).

BRIEF DESCRIPTION OF THE DRAWINGS

FIGS. 3A-3H are diagrams illustrating an exemplary process of an exemplary embodiment of the congestion control service;

FIG. 4 is a diagram illustrating exemplary components of a device that may correspond to one or more of the devices illustrated and described herein;

DETAILED DESCRIPTION OF PREFERRED EMBODIMENTS

Figure 1:
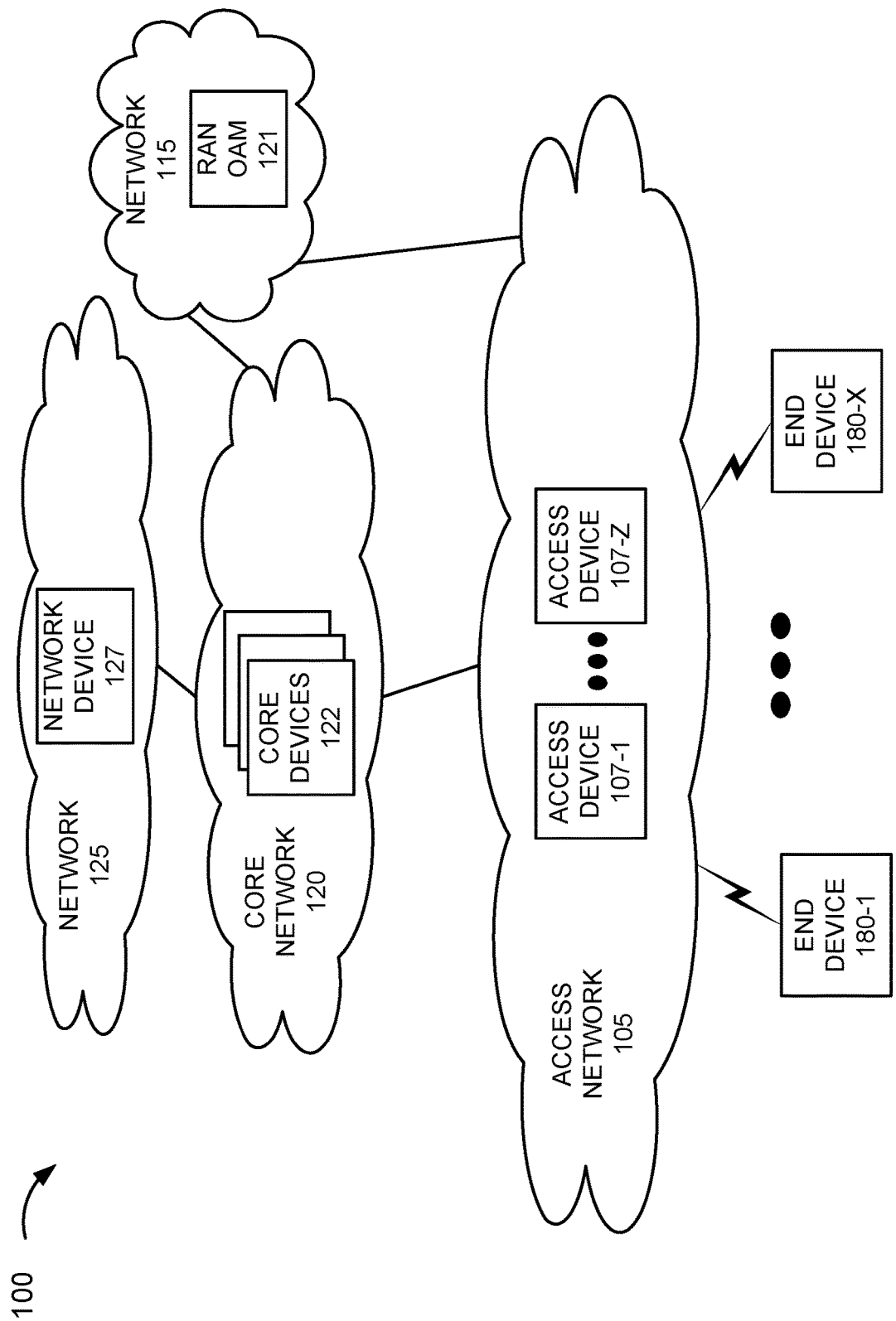
FIG. 1 is a diagram illustrating an exemplary environment in which an exemplary embodiment of a congestion control service may be implemented.

The following detailed description refers to the accompanying drawings. The same reference numbers in different drawings may identify the same or similar elements. Also, the following detailed description does not limit the invention.

A network should support various use cases, meet various performance metrics, allow for scalability and flexibility, and may be implemented based on SDN and NFV in an integrated fashion. Ubiquitous automation, network slicing, closed loop service assurance, self-healing, and other network attributes and/or services may be integral aspects of the network. For example, network slicing services of the network may create and dynamically manage functionally isolated networks (e.g., virtualized, logical, physical, etc.).

A network may include a radio access network (RAN) and a core network that provides access to a service or application layer network, a cloud network, a multi-access edge computing (MEC) network, a fog network, and so forth. The network may also include networks of diverse technologies (e.g., Fourth Generation (4G) wireless, 4.5G wireless, Fifth Generation (5G) wireless, backhaul/fronthaul network, Long Term Evolution (LTE), LTE-Advanced (LTE-A), LTE-A Pro, etc.) that may use different segments of radio spectrum (e.g., centimeter (cm) wave, millimeter (mm) wave, below 6 Gigahertz (GHz), above 6 GHz, licensed radio spectrum, unlicensed radio spectrum, particular frequency band, carrier frequency, etc.). Additionally, the network may include different and multiple functional splitting, such as options 1, 2, 3, 4, 5, 6, 7, or 8 that relate to the splitting of the physical layer, Media Access Control (MAC), Radio Link Control (RLC), and Packet Data Convergence Control (PDCP), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA), network slicing, coordinated multipoint (CoMP), and/or another type of connectivity service.

In view of the diversification of such a network, there are resource management and congestion control issues that need to be addressed. Currently, for example, there is no mechanism that manages congestion control in a RAN that supports 4G LTE and 5G NR, and/or other combination of radio access technologies (RATs), along with the various splitting features and services (e.g., network slicing, etc.) that have been mentioned. Unfortunately, a network that does not include mechanisms to manage such issues will suffer from waste of various network resources, such as physical network resources (e.g., processor, memory, storage, communication interface, communication link, etc.) from both the network-side and the end device-side, logical network resources, virtual network resources, as well as other degradations that inherently arise therefrom (e.g., congestion, quality of service (QoS), access barring, etc.).

According to exemplary embodiments, a congestion control system provides a congestion control service, as described. According to an exemplary embodiment, the congestion control service manages congestion for a RAN that includes multiple and different RATs and splitting configurations and/or connectivity services (referred to herein as a "diversified RAN"), as described herein.

According to an exemplary embodiment, the congestion control system mitigates congestion and/or predictive congestion (e.g., anticipative future congestion) of the diversified RAN based on reallocating radio spectrum used by the diversified RAN in relation to traffic. For example, the congestion control system may reallocate radio spectrum between LTE and NR based on the congestion information (e.g., congestion information pertaining to network slices, 5G, 4G, and/or other diversified RAN configuration (e.g., type of split, option, plane, interface, etc.)), or reallocate between any other types/ranges of radio spectrum.

According to an exemplary embodiment, the congestion control system mitigates congestion and/or predictive congestion of the diversified RAN based on a network slice reconfiguration. For example, congestion control system may modify resources allocated to a network slice (e.g., increase and/or decrease a physical, virtual, and/or logical resource) that is subject to the congestion and/or the predictive congestion, may shift traffic from one network slice to another network slice, and/or create a new network slice (e.g., based on unused network resources and/or a modification of resources allocated to a network slice).

According to an exemplary embodiment, the congestion control system mitigates congestion and/or predictive congestion of the diversified RAN based on the selection of policy or rule changes relative to the current policy or rule associated with the network resources that pertain to the congestion and/or the predictive congestion. For example, the policy or the rule may change the priority of the frequency band for subsequent end device attachments or change some other configuration associated with the diversified RAN. According to an exemplary embodiment, the policy or rule change is selected by a policy device (e.g., a policy control function (PCF), a policy and charging rules function (PCRF), or another type of network device that manages policies or rules for the diversified RAN) based on the congestion information. As a result, as described herein, the congestion control system includes dynamic selection and application of rules and policies to mitigate congestion and predictive congestion in the diversified RAN responsive to the congestion information. This is in contrast to a policy or rule approach that is static regardless of the state (e.g., congestion level/state) of a RAN or a diversified RAN.

According to an exemplary embodiment, the congestion control service is provisioned as a closed-loop system that includes obtaining the congestion information from the diversified RAN, selecting a network configuration that mitigates the congestion and/or the predictive congestion, and providing the network configuration to the diversified RAN for execution. As previously described, the network configuration may include changes to a policy or a rule, a network slice, radio spectrum allocation, and/or other types of configurations.

As a result, the congestion control service may improve network resource utilization in a network. For example, the congestion control service may improve the use of various network resources (e.g., physical, logical, virtual) in relation to network resources of the diversified RAN and other networks (e.g., a core network, a service layer network, etc.). Additionally, the congestion control service may improve resource utilization at an end device. For example, the congestion control service may improve the use of various resources (e.g., memory, processor, communication interface, radio resources, etc.) in relation to the end device when a network resource of the diversified RAN is congested or predictably congested. The congestion control service may minimize or prevent measures to be executed by a network and/or an end device (e.g., a cell reselection procedure, invoke a handover procedure, access barring, etc.) when a portion of the diversified RAN is in a congested state.

FIG. 1 is a diagram illustrating an exemplary environment 100 in which an exemplary embodiment of the congestion control service may be implemented. As illustrated, environment 100 includes an access network 105, a network 115, a core network 120, and a network 125. Access network 105 includes access nodes 107-1 through access nodes 107-Z (also referred to collectively as access nodes 107 and, individually or generally as access device 107). Network 115 includes a RAN Operations, Administration, and Management device 121. Core network 120 includes core network devices 122. Network 125 includes a network device 127. Environment 100 further includes end devices 180-1 through 180-X (also referred to collectively as end devices 180 and, individually or generally as end device 180).

According to other embodiments, environment 100 may include additional devices, fewer devices, and/or different types of devices than those illustrated and described herein. For example, a function of a single network device may be implemented by multiple devices, and/or functions of multiple network devices may be implemented by a single network device. In this regard, the number, type, and/or arrangement of network devices (also known as network elements or network functions) in environment 100 are exemplary. A network device, a network element, or a network function (referred to herein simply as a network device) may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, a cloud device, a virtualized function, etc). According to other exemplary embodiments, environment 100 may include additional networks, fewer networks, and/or different networks than those illustrated and described herein.

Environment 100 includes communication links. Environment 100 may be implemented to include wired, optical, and/or wireless communication links among networks, network devices, and end devices, as illustrated. A communicative connection via a communication link may be direct or indirect. For example, an indirect communicative connection may involve an intermediary device and/or an intermediary network not illustrated in FIG. 1. The number and the arrangement of communication links illustrated in environment 100 are exemplary.

Access network 105 includes the diversified RAN, as described herein. According to an exemplary embodiment, access network 105 is implemented by a technology that supports network slicing. According to an exemplary implementation, access network 105 may include a 4G radio access network (RAN) (e.g., an Evolved UMTS Terrestrial Radio Access Network (E-UTRAN) of a Long Term Evolution (LTE) network) or 4.5G RAN (e.g., an E-UTRAN of an LTE-Advanced (LTE-A) network), and a future or next generation RAN (e.g., a 5G-access network (5G-AN) or a 5G-RAN (referred to herein as simply a 5G-RAN)). According to other exemplary implementations, access network 105 may include other types of RANs (e.g., a Third Generation (3G) RAN, a 3.5G RAN, a U-TRAN, a Universal Mobile Telecommunications System (UMTS) RAN, a Global System for Mobile Communications (GSM) RAN, a GSM EDGE RAN (GERAN), a Code Division Multiple Access (CDMA) RAN, a Wideband CDMA (WCDMA) RAN, an Ultra Mobile Broadband (UMB) RAN, a High-Speed Packet Access (HSPA) RAN, and/or an Evolution Data Optimized (EV-DO) RAN).

Access network 105 may communicate with other types of access networks, such as, for example, a WiFi network, a Worldwide Interoperability for Microwave Access (WiMAX) network, a local area network (LAN), a Citizens Broadband Radio System (CBRS) network, a cloud RAN, a wired network (e.g., optical, cable, coaxial, copper, etc.), or other type of network that provides access to or can be used as an on-ramp to access network 105, core network 120 and/or network 125.

Depending on the implementation, access network 105 may include various types of network devices that are illustrated in FIG. 1 as access devices 107. For example, access device 107 may be implemented as an evolved Node B (eNB), an eLTE eNB, a next generation Node B (gNB), a base station (BS), a base transceiver station (BTS), a Node B, a remote radio head (RRH), an RRH and a baseband unit (BBU), a BBU, a radio network controller (RNC), a wireless node (e.g., a small cell node (e.g., a picocell device, a femtocell device, a microcell device, a home eNB, a repeater, etc.)), or another type of network device. Additionally, as previously described, access network 105 may include various types of functional splitting relating to interfaces (e.g., E1, F1, etc.), layer options (MAC, RLC, etc.), CU, DU, communication planes, as well as other types of network services, such as DC, CA, network slicing, and/or another type of connectivity service.

According to various exemplary embodiments, access device 107 may be implemented according to various architectures of wireless service, such as, for example, macrocell, microcell, femtocell, picocell, metrocell, non-cell, or other configuration. Additionally, according to various exemplary embodiments, access device 107 may be implemented according to various wireless technologies, wireless standards, wireless frequencies/bands, and so forth.

According to an exemplary embodiment, access devices 107 include functions that support the congestion control service, as described herein. Additionally, according to an exemplary embodiment, interfaces of access devices 107 provide for the communication of messages in support of the congestion control service, as described herein. For example, according to an exemplary embodiment, access device 107 includes logic that generates and transmits congestion information to RAN OAM 121. Additionally, according to an exemplary embodiment, access device 107 includes logic that receives congestion mitigation information from core device 122, and executes congestion mitigation based on the congestion mitigation information. As previously described, the congestion mitigation may include re-allocating spectrum for use by end devices 180, modifying radio resource scheduling, modifying network slicing, enforcing a policy or a rule, and/or other types of procedures, as described herein.

Network 115 includes a network of one or multiple technologies. According to an exemplary embodiment network 115 is a network management network. According to an exemplary embodiment, RAN OAM 121 includes a network device that receives or obtains congestion information from access devices 107. For example, access devices 107 may communicate with RAN OAM 121 via a control plane, a network management plane, or another type of communication plane. The congestion information may pertain to 5G access nodes 107, 4G access nodes 107, etc., of access network 105. According to an exemplary embodiment, RAN OAM 121 includes logic that identifies one or multiple attributes of the congestion information, and based on such identification, communicates the congestion information to suitable core devices 122 for further processing (e.g., congestion analytics, congestion mitigation selection, etc.), as described herein.

Core network 120 includes a network of multiple types and technologies. According to an exemplary embodiment, core network 120 is implemented by a technology that supports network slicing. According to an exemplary implementation, core network 120 includes a complementary network pertaining to access network 105. For example, core network 120 may include network devices of an LTE network (e.g., LTE, LTE-A, LTE-A Pro) and a next generation core network (NGC), which may be depicted as core devices 122. According to other examples, core network 120 may include different complementary network devices of a core network pertaining to access network 105. By way of further example, core devices 122 may include a mobility management entity (MME), a user plane function (UPF), a packet data network gateway (PGW), a serving gateway (SGW), a session management function (SMF), an access and mobility management function (AMF), a PCF, as well as other network devices pertaining to various network-related functions, such as billing, security, authentication and authorization, network polices, subscriber profiles, and/or other network devices that facilitate the operation of core network 120.

According to an exemplary embodiment, core devices 122 include functions that support the congestion control service, as described herein. According to an exemplary embodiment, interfaces of core devices 122 provide for the communication of messages in support of the congestion control service, as described herein.

According to an exemplary embodiment, core device 122 includes logic that receives congestion information, identifies a type of congestion information, analyzes and determines whether congestion or predictive congestion exists, selection congestion mitigation measures, and provides congestion mitigation information to access devices 107. As previously described, the congestion mitigation information may provide for the re-allocation of radio spectrum for use by end devices 180, modifying radio resource scheduling, modifying network slicing, enforcing a policy or a rule, and/or other types of procedures, as described herein.

Network 125 includes one or multiple networks of one or multiple types and technologies. According to an exemplary embodiment, network 125 is implemented by a technology that supports network slicing. According to an exemplary embodiment, network 125 provides an application and/or a service to end device 180. For example, network 125 may be implemented to include a service or an application-layer network, the Internet, the World Wide Web (WWW), an Internet Protocol Multimedia Subsystem (IMS) network, a Rich Communication Service (RCS) network, a cloud network, a packet-switched network, a data center, or other type of network that hosts an end device application or service. For example, the end device application/service network may provide various applications/services pertaining to broadband access in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, etc.), extreme real-time communications (e.g., tactile Internet, etc.), lifeline communications (e.g., natural disaster, etc.), ultra-reliable communications (e.g., automated traffic control and driving, collaborative robots, health-related services (e.g., monitoring, remote surgery, etc.), drone delivery, public safety, etc.), and/or broadcast-like services.

Depending on the implementation, network 125 may include various network devices (illustrated as network device 127) that provide various applications, services, or other type of end device assets, such as servers (e.g., web, application, cloud, etc.), mass storage devices, data center devices, and/or other types of network devices pertaining to various network-related functions.

End device 180 includes a device that has computational and wireless communication capabilities. End device 180 may be implemented as a mobile device, a portable device, or a stationary device. End device 180 may be implemented as a Mobile Broadband device, a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a user device, or some other type of wireless end node. By way of further example, end device 180 may be implemented as a smartphone, a personal digital assistant, a tablet, a netbook, a phablet, a wearable device, a set top box, an infotainment system in a vehicle, a vehicle support system, a smart television, a game system, a music playing system, or some other type of wireless user device. According to various exemplary embodiments, end device 180 may be configured to execute various types of software (e.g., applications, programs, etc.). The number and the types of software may vary among end devices 180. End device 180 may support one or multiple RATs (e.g., 4G, 5G, etc.), one or multiple frequency bands, and so forth. Additionally, end device 180 may include one or multiple communication interfaces that provide one or multiple (e.g., simultaneous) connections via the same or different RATs, frequency bands, and so forth.

Figure 2:
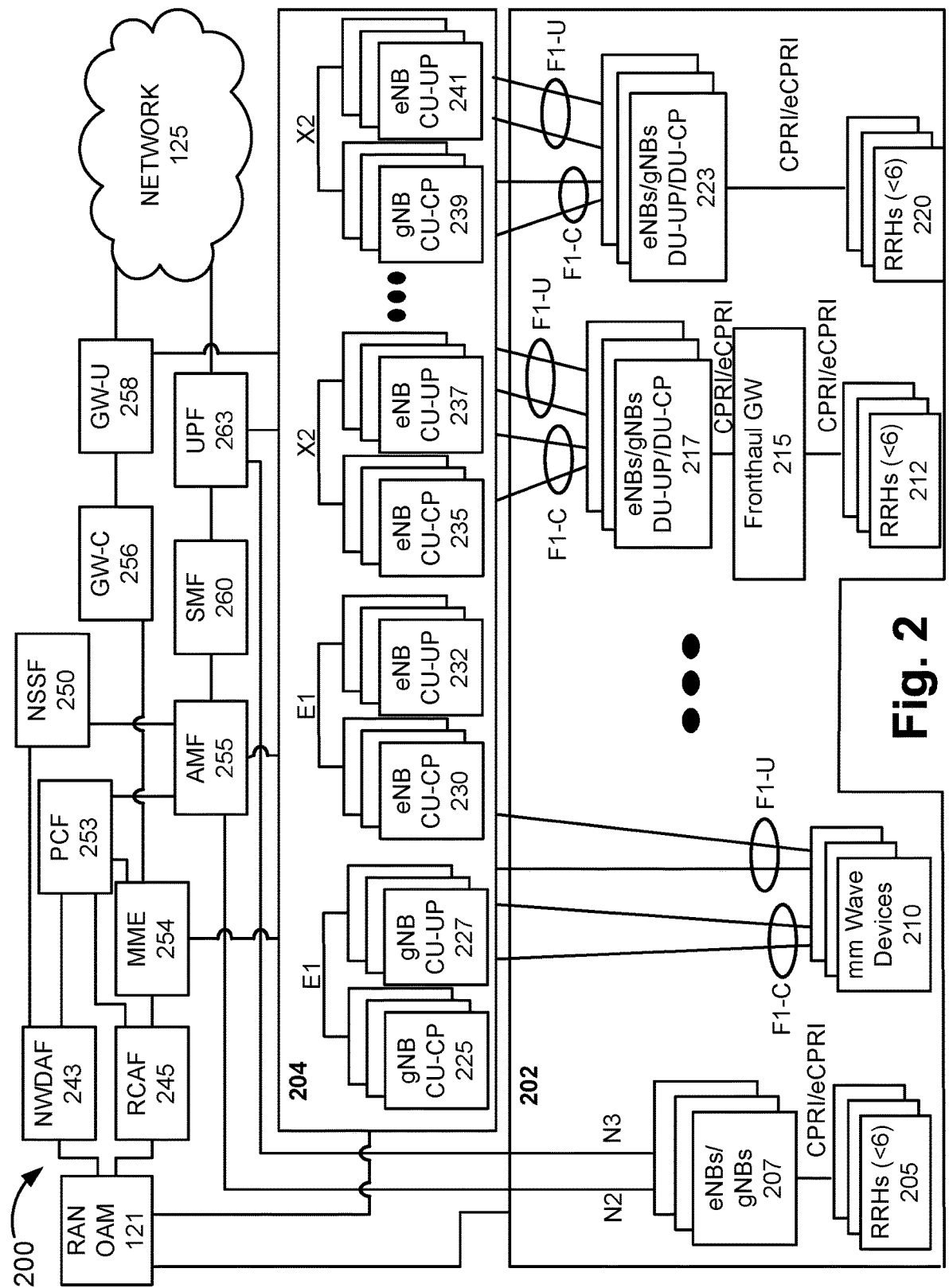
FIG. 2 is a diagram illustrating another exemplary environment in which an exemplary embodiment of the congestion control service may be implemented.

FIG. 2 is a diagram illustrating an exemplary environment 200 that is consistent with environment 100 and supports the congestion control service, as described herein. As illustrated, the diversified RAN may include a first layer 202 of access devices 107 and a second layer 204 of access devices 107. Access devices 107 of first layer 202 and second layer 204 include logic that provides the congestion control service, as described herein. The communication links and interfaces illustrated and described are exemplary in terms of number, connectivity, and type. The interfaces may be implemented as reference point-based or service-based.

As illustrated, first layer 202 may include RRH devices 205, eNBs/gNBs 207, millimeter (mm) wave devices 210, RRH devices 212, a fronthaul gateway 215, eNBs/gNBs 217, RRH devices 220, and eNBs/gNBs 223. As further illustrated, first layer 202 may include various interfaces and communication links, such as for example, CPRI, enhanced CPRI (eCPRI), F1 interfaces that support the control plane and the user plane, and NG interfaces. These interfaces and communication links may support 4G systems (e.g., LTE, LTE-A, LTE-A Pro) and 5G systems (e.g., NR). Additionally, these interfaces and communication links may support communication in support of the congestion control service, as described herein. Although not illustrated, some access devices 107 of first layer 202 (e.g., eNBs/gNBs 207, etc.) may include additional interfaces, such as X2, Xn, Xx, etc., and communication links that allow communication between access devices 107 of first layer 202.

According to this example, RRH devices 205, 212 and 220 may operate in the radio spectrum below 6 GHz, while mm wave devices 210 may operate in a higher radio spectrum. According to other examples, a different configuration relating to these devices and radio spectrum may be implemented. Further, as illustrated, eNBs/gNBs 217 and 223 may be implemented as DUs that support the control plane and the user plane. Fronthaul gateway 215 may include a network device that supports a fronthaul transport network service between RRH devices and DUs.

Second layer 204 may include gNBs 225, gNBs 227, eNBs 230, eNBs 232, eNBs 235, eNBs 237, gNBs 239, and eNBs 241 that are implemented as CUs that support the control plane and the user plane. As further illustrated, second layer 204 may include various interfaces, such as F1 interfaces that support the control plane and user plane, and allow communication with access devices 107 of first layer 202 via the communication links. Additionally, second layer 204 may include other interfaces, such as for example, E1 and X2 that may support the control plane and the user plane, and allow communication between access devices 107 of second layer 204. Additionally, these interfaces and communication links may support communication in support of the congestion control service, as described herein. Although not illustrated, some access devices 107 of second layer 204 may include additional interfaces, such as Xn, Xx, etc., and communication links that allow communication between access devices 107 of first layer 202.

As further illustrated in FIG. 2 and consistent with core network 120, environment 200 includes core devices 122, such as for example, a network data analytics function (NWDAF) 234, a RAN congestion awareness function (RCAF) 245, a network slice selection function (NSSF) 250, a PCF 253, an MME 254, an AMF 255, a gateway-control plane (GW-C) 256, a gateway-user plane (GW-U) 258, a session management function (SMF) 260, and a UPF 263; and RAN OAM 121. At least some of these core devices 122 include logic that provides the congestion control service, as described herein. The communication links illustrated are exemplary in terms of number and connectivity.

Although not illustrated, core devices 122 of FIG. 2 may communicate with each other via service-based and/or reference point-based interfaces. According to an exemplary embodiment, the service-based and/or reference point may be modified (e.g., relative to standard associated with Third Generation Partnership Project (3GPP), International Telecommunication Union (ITU), European Telecommunications Standards Institute (ETSI), etc.) in order to support the communication (e.g., transmission and reception of messages, information elements (IE), attribute value pairs (AVPs), etc.) between network devices and the congestion control service, as described herein.

As previously described, RAN OAM 121 includes logic that receives congestion information from access network 105 (e.g., access devices 107 of the diversified RAN including first layer 202 and second layer 204). RAN OAM 121 includes logic that identifies one or multiple attributes of the congestion information, and based on such identification, communicates the congestion information to core devices 122. According to an exemplary embodiment, the core devices 122 to which RAN OAM 121 communicate include NWDAF 243 and RCAF 245. For example, RAN OAM 121 may transmit a message, which includes the congestion information, to NWDAF 243, based on identifying a first set of one or multiple attributes of the congestion information. Conversely, RAN OAM 121 may transmit a message, which includes the congestion information, to RCAF 245, based on identifying a second set of one or multiple attributes of the congestion information. According to an exemplary embodiment, the selection of NWDAF 243 or RCAF 245 may be mutually exclusive. For example, NWDAF 243 may analyze 5G and/or network-slice related congestion information, while RCAF 245 may analyze 4G and/or non-network-slice related congestion information. According to other example, the attributes configured may be different, as described herein.

According to an exemplary embodiment, the attribute of the congestion information that RAN OAM 121 identifies may pertain to the type of access device 107 (e.g., gNB, eNB, etc.) and the radio spectrum (e.g., mm wave, 4G, 5G, centimeter (cm) wave, a frequency band, etc.) within which access device 107 operates.

According to other exemplary embodiments, the attribute of the congestion information may pertain to other characteristics of the diversified RAN, such as the type of functional split relating to the RAN interface (e.g., F1, CPRI, etc.), plane of communication (e.g., control, user, etc.), network slice versus not network slice, type of option (e.g., 1, 2, etc.), type of RAT (e.g., LTE, LTE-A, NR, etc.), etc., as described herein.

According to yet another exemplary embodiment, the attribute of the congestion information may pertain to the type of network service (e.g., DC, CA, etc.) to which the congestion and/or the predictive congestion relates.

According to still other exemplary embodiments, the attribute of the congestion information may pertain to the traffic of the RAN to which the congestion and/or the predictive congestion relates. For example, the attribute may relate to a priority of traffic (e.g., mission critical, real-time, etc.), the user plane bearer service (e.g., voice, virtual reality, IoT, video streaming, etc.), application slice, a QoS/attribute of the application and/or application slice, a specific band carrier, and/or a specific carrier type (e.g., LTE, NR, shared LTE/NR carrier, etc.).

NWDAF 243 includes logic that analyzes congestion information. NWDAF 243 includes logic that stores congestion threshold parameters and values, and uses these parameters and values for comparison to the parameters and values included in the congestion information received from RAN OAM 121. According to various exemplary embodiments, the congestion threshold parameters and values may pertain to load levels in relation to various network resources (e.g., physical, logical, virtual) including, for example, network slices, radio resources (e.g., physical resource blocks, radio spectrum, etc.), and other load levels pertaining to functional splits (e.g., interfaces, options, etc.) and network services (e.g., DC, CA, etc.), as described herein. According to an exemplary embodiment, NWDAF 243 determines whether congestion and/or predictive congestion exist(s) based on a result of the comparison.

According to an exemplary embodiment, NWDAF 243 includes logic that communicates with PCF 253 in response to determining that congestion and/or predictive congestion exist(s). In this way, as a part of the congestion control service, a policy or a rule may be selected and applied in the diversified RAN of access network 105 (and potentially in other portions of the network (e.g., core network 120, network 125)) to mitigate the congestion and/or predictive congestion. For example, NWDAF 243 may generate and transmit a message to PCF 253. The message may include information that indicates a type of congestion and/or a type of predicted congestion. The message may include other types of information, such as for example, network resource identifiers that identify network resources to which the congestion and/or predicted congestion pertain(s), a level of congestion (e.g., high, medium, low, etc.), a user plane bearer service associated with the congestion/predicted congestion, and/or other information pertaining to functional splits, network services, etc.

According to an exemplary embodiment, NWDAF 243 includes logic that communicates with NSSF 250 in response to determining that congestion and/or predictive congestion exist(s) in relation to a network slice. In this way, as a part of the congestion control service, a modification to a network slice configuration may be provisioned. For example, NWDAF 243 may generate and transmit a message to NSSF 250. The message may include information that indicates a type of congestion and/or a type of predicted congestion. The message may include other types of information, such as for example, a network slice identifier that identifies a network slice to which the congestion and/or predicted congestion pertain(s), a level of congestion (e.g., high, medium, low, etc.), a user plane bearer service associated with the congestion/predicted congestion, and/or other information pertaining to functional splits, network services, etc.

RCAF 245 includes logic that analyzes congestion information. RCAF 245 includes logic that stores congestion threshold parameters and values, and uses these parameters and values for comparison to the parameters and values included in the congestion information received from RAN OAM 121. According to various exemplary embodiments, the congestion threshold parameters and values may pertain to load levels in relation to various network resources (e.g., physical, logical, virtual) including, for example, radio resources (e.g., physical resource blocks, radio spectrum, etc.), and other load levels pertaining to functional splits (e.g., interfaces, options, etc.) and network services (e.g., DC, CA, etc.), as described herein. According to an exemplary embodiment, RCAF 245 determines whether congestion and/or predictive congestion exist(s) based on a result of the comparison.

According to an exemplary embodiment, RCAF 245 includes logic that communicates with PCF 253 in response to determining that congestion and/or predictive congestion exist(s). For example, PCF 253 may include a policy and charging rules function (PCRF) associated with a 4G architecture. In this way, as a part of the congestion control service, a policy or a rule may be selected and applied in the diversified RAN of access network 105 (and potentially in other portions of the network (e.g., core network 120, network 125)) to mitigate the congestion and/or predictive congestion. For example, RCAF 245 may generate and transmit a message to PCF 253. The message may include information that indicates a type of congestion and/or a type of predicted congestion. The message may include other types of information, such as for example, network resource identifiers that identify network resources to which the congestion and/or predicted congestion pertain(s), a level of congestion (e.g., high, medium, low, etc.), a user plane bearer service associated with the congestion/predicted congestion, slice identifier, and/or other information pertaining to functional splits, network services, etc.

NSSF 250 includes a network device that provides network slicing services, such as selecting network slice instances to serve end devices 180, determining the allowed network slice selection assistance information (NSSAI), and determining the AMF 255 to be used to serve end devices 180. According to an exemplary embodiment, NSSF 250 includes logic that communicates with NWDAF 243. For example, NSSF 250 may receive a message from NWDAF 243 that triggers a network slice re-allocation so as to mitigate congestion and/or predicted congestion. The message may include information that indicates a type of congestion and/or a type of predicted congestion. The message may include other types of information, such as for example, network slice identifiers that identify network slices to which the congestion and/or predicted congestion pertain(s), a level of congestion (e.g., high, medium, low, etc.), a user plane bearer service associated with the congestion/predicted congestion, and/or other information pertaining to functional splits, network services, etc.

According to an exemplary embodiment, based on the message, NSSF 250 includes logic that modifies resources allocated to a network slice (e.g., increase and/or decrease a physical, virtual, and/or logical resource) that is subject to the congestion and/or the predictive congestion, may shift traffic from one network slice to another network slice, and/or create a new network slice (e.g., based on unused network resources and/or a modification of resources allocated to a network slice).

According to an exemplary embodiment, NSSF 250 includes logic that communicates with AMF 255. For example, NSSF 250 may generate and transmit a message, which includes network slice re-allocation information calculated by NSSF 250, to AMF 255. As described herein, the network slice re-allocation information may be provided to access network 105 and executed so as to mitigate the congestion and/or predicted congestion.

PCF 253 includes a network device that provides policy rules to control plane network devices and accesses subscription information relevant for policy decisions. According to an exemplary embodiment, PCF 253 includes logic that communicates with NWDAF 243. For example, PCF 253 may receive a message from NWDAF 243 that triggers the selection of a policy or a rule so as to mitigate congestion and/or predicted congestion. The message may include information that indicates a type of congestion and/or a type of predicted congestion. The message may include other types of information, such as for example, a level of congestion (e.g., high, medium, low, etc.), a user plane bearer service associated with the congestion/predicted congestion, and/or other information pertaining to functional splits, network services, network slice, uplink/downlink policy/enforcement, etc.

According to an exemplary embodiment, based on the message from NWDAF 243, PCF 253 includes logic that selects a policy or a rule that correlates to information included in the message. For example, PCF 253 may store a database or other data structure that correlates policies and rules to the congestion information. PCF 253 includes logic that performs a look-up or query to identify the appropriate policy or rule configured to mitigate the congestion and/or predicted congestion. According to an exemplary embodiment, PCF 253 includes logic that communicates with AMF 255. For example, PCF 253 generates and transmits a message, which includes the selected policy or the rule, to AMF 255. As described, the congestion control service provides for the communication and enforcement of the selected policy or rule in the diversified RAN. The selected policy or rule may also be communicated to other core devices 122 for enforcement purposes.

In a manner similar to that previously described, PCF 253 includes logic that communicates with RCAF 245. For example, PCF 253 may include a PCRF. PCF 253 may receive a message from RCAF 245 that triggers the selection of a policy or a rule so as to mitigate congestion and/or predicted congestion. The message may include information that indicates a type of congestion and/or a type of predicted congestion. The message may include other types of information, such as for example, a level of congestion (e.g., high, medium, low, etc.), a user plane bearer service associated with the congestion/predicted congestion, and/or other information pertaining to functional splits, network services, etc. PCF 253 generates and transmits a message, which includes the selected policy or the rule, to MME 254. Additionally, MME 254 may be integrated with or separate from AMF 255.

MME 254 includes a network device that provides management services, such as radio resource management, mobility and roaming management, and network access control. According to an exemplary embodiment, MME 254 includes logic that communicates with RCAF 245 and PCF 253, as previously described. MME 254 includes logic that generates and transmits a message, which includes congestion mitigation information, to access devices 107 of the diversified RAN. For example, the congestion mitigation information includes the policy or the rule to be executed and enforced by the appropriate access devices 107 to which the policy or the rule pertains. The congestion mitigation information may include other types of information, such as QoS parameters/values, access class barring parameters, and so forth.

According to an exemplary embodiment, the policy or the rule includes radio spectrum re-allocation. According to an exemplary implementation, the radio spectrum re-allocation may provide for dynamic sharing of radio spectrum. For example, in-carrier dynamic sharing of radio spectrum may involve an advanced wireless service (AWS) carrier or another type of carrier that is shared between LTE and NR technologies by access devices 107 (e.g., a RAN scheduler) or between other types of radio technologies/spectrum (e.g., WiFi, unlicensed, licensed, etc.). The sharing of the carrier may be time-based, such as allocating a portion of time for use of the carrier to LTE and another portion of time for use of the carrier to NR.

According to another exemplary implementation, the radio spectrum re-allocation may provide for the adjustment of static radio spectrum allocation. For example, a portion of the spectrum associated with the AWS carrier or another type of carrier may be divided for use by LTE and NR. By way of further example, assume the AWS carrier has 20 MegaHertz (MHz) of bandwidth, the radio spectrum re-allocation may include assigning 15 MHz of the carrier bandwidth to LTE and 5 MHz of the carrier bandwidth to NR. According to other exemplary implementations, the radio spectrum re-allocation may include an adjustment of the carrier in terms of both time and amount relative to the RATs involved.

According to other exemplary embodiments, the policy or the rule may include other types congestion mitigation mechanisms, such as indicating priority of a band on which end device 180 first camps based on various use cases (e.g., coverage band, capacity band, fixed end device 180, mobile end device 180, use of MEC, type of bearer service (e.g., type of end device application/service), etc.).

AMF 255 includes a network device that provides access and mobility-related services, such as registration management, connection management, mobility management, access authentication and authorization, and termination of control plane interface (e.g., N2) and non-access stratum (NAS-N1). According to an exemplary embodiment, AMF 255 includes logic that communicates with NSSF 250 and PCF 253, as previously described. AMF 255 includes logic that generates and transmits a message, which includes congestion mitigation information, to access devices 107 of the diversified RAN. For example, the congestion mitigation information includes the policy or the rule to be executed and enforced by the appropriate access devices 107 and network slices to which the policy or the rule pertains. The congestion mitigation information may include other types of information, such as QoS parameters/values, access class barring parameters, and so forth.

According to an exemplary embodiment, the policy or the rule includes radio spectrum re-allocation. According to some exemplary implementations, the radio spectrum re-allocation pertains to a network slice. According to other exemplary embodiments, the policy or the rule may include other types congestion mitigation mechanisms, such as indicating priority of a band on which end device 180 first camps based on various use cases (e.g., coverage band, capacity band, fixed end device 180, mobile end device 180, use of MEC, type of bearer service (e.g., type of end device application/service), etc.). For example, if current voice traffic or another type of end device application or service provided by the diversified RAN to end devices 180 is experiencing congestion (e.g., not meeting QoS requirements), the policy or rule may assign more time and/or spectrum amount to NR relative to LTE in support of the delivery of the voice service or other end device application or service. Alternatively, if current congestion of the diversified RAN relates to more NR users than LTE users, then the policy or the rule may indicate more time and/or spectrum amount to NR users relative to LTE users.

GW-C 256 and GW-U 258 includes network devices that may provide services akin to an SGW and a PGW. For example, GW-C 256 may manage handovers, data transfer of packets across the user plane, monitors and maintains context information related to end devices 180, IP address allocation to end devices 180, charging, and generates paging requests when data from network 125 arrives for end devices 180. Additionally, for example, GW-U 258 may provide level gating control, rate enforcement, and bearing binding.

SMF 260 includes a network device that provides session management services, such as Internet Protocol (IP) address allocation and management for end devices, control part of policy enforcement and Quality of Service (QoS), traffic steering, and selection and control of user plane function.

UPF 263 includes a network device that provides user plane services, such as for example, packet routing and forwarding, interconnection to a data network (e.g., network 125), policy enforcement, QoS handling for user plane, and data buffering.

While environment 200 has been described to include various access devices 107 and core devices 122, according to other exemplary embodiments, environment 200 may include additional, different, and/or fewer access devices 107 and/or core devices 122. For example, core devices 122 may include a charging system (CS), a network repository function (NRF), a unified data management (UDM) device, a home subscriber server (HSS), an authentication server function (AUSF), and/or another known network device of a core network, which have been omitted solely for the purpose of brevity. Additionally, while network devices of environment 200 have been described, such network devices may also operate and provide a network function or a network service according to a standard (e.g., 3GPP, ITU, ETSI, etc.) and/or a proprietary technology. Further, it is to be understood that the nomenclature of the network devices, interfaces, and messages are considered new or enhancements relative to the network devices, interfaces, and message that may exist according to a standard by way of the congestion control service, as described herein.

Figure 3B:
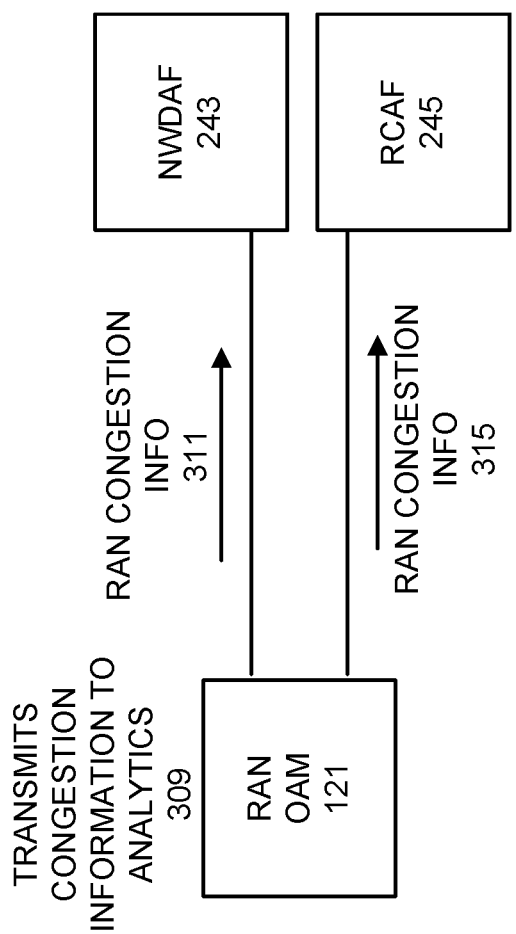

FIGS. 3A-3H are diagrams illustrating an exemplary process of the congestion control service. Referring to FIG. 3A, one or multiple access devices 107 of first layer 202 may transmit congestion information 301 to RAN OAM 121, and one or multiple access devices 107 of second layer 204 may transmit congestion information 303 to RAN OAM 121. RAN OAM 121 obtains the transmitted congestion information 305, and determines the RAT (e.g., LTE, NR, etc.) for which the congestion information pertains 307.

Referring to FIG. 3B, RAN OAM 121 transmits the congestion information to the appropriate analytics 309 based on the determination. For example, RAN OAM 121 may transmit RAN congestion information 311 to NWDAF 243 for congestion information pertaining to the NR portion and/or network slices of the diversified RAN, and may transit RAN congestion information 315 to RCAF 245 for congestion information pertaining to the LTE portion of the diversified RAN.

Figure 3C:
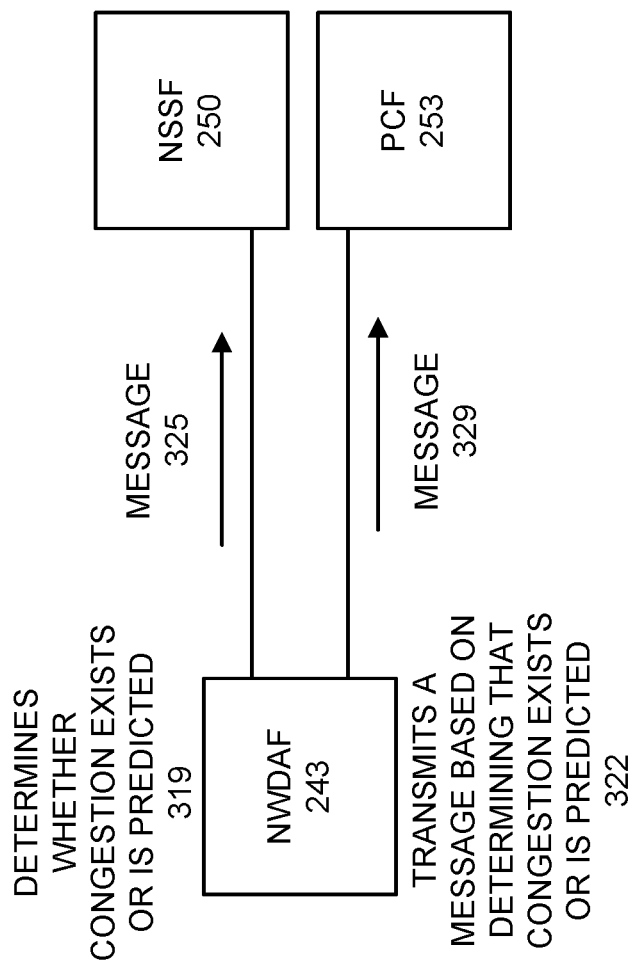

Referring to FIG. 3C, in response to receiving the message from RAN OAM 121, NWDAF 243 analyzes the RAN congestion information, and determines whether congestion and/or predicted congestion exist(s) 319. According to this exemplary scenario, assume that congestion and/or predicted congestion exist(s). In response, NWDAF 243 transmits a message to NSSF (e.g., message 325) and a message to PCF 253 (e.g., message 329) based on determining that congestion exists or is predicted 322. According to some exemplary embodiments, NWDAF 243 may obtain thresholds from network 115 to make such determinations.

Figure 3D:
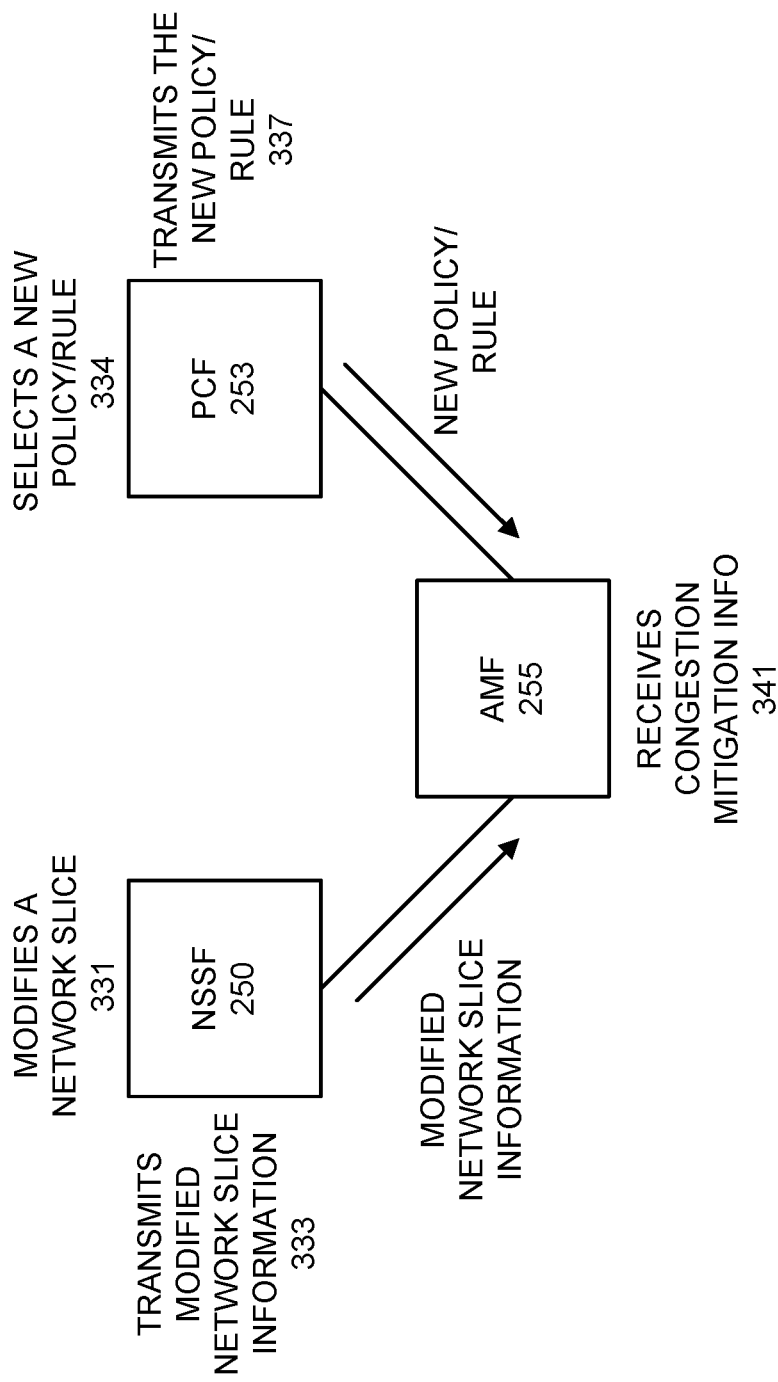

Referring to FIG. 3D, in response to receiving message 325, NSSF 250 calculates a configuration for modifying a network slice 331, as previously described. NSSF 250 may generate and transmit a message, which includes information indicating the configuration of a modified network slice 333, to AMF 255. Additionally, in response to receiving message 329, PCF 253 may select a new policy or a rule 334, as previously described. PCF 253 may generate and transmit the new policy or rule 337 to AMF 255. As illustrated, AMF 255 receives the congestion mitigation information 341 from NSSF 250 and PCF 253.

Referring to FIG. 3E, in response to receiving the congestion mitigation information, AMF 255 identifies access devices 107 of the diversified RAN to which the congestion mitigation information pertains 341, and transmits the congestion mitigation information 343. In response to receiving the congestion mitigation information message 347 and congestion mitigation information message 354, access devices 107 of second layer 204 and access devices 107 of first layer 202, to which the congestion mitigation information pertains, is executed 351 and 356. According to an exemplary scenario, the congestion mitigation information includes a new policy or rule, which includes spectrum re-allocation in relation to one or multiple network slices, may be applied and enforced. For example, a RAN schedule of access devices 107 of first layer 202 may re-allocate radio spectrum according to time and/or amount, as previously described. Additionally, for example, access devices 107 of first layer 202 and second layer 204 may adjust a network slice, as previously described. According to other exemplary scenarios, additional, different, or fewer measures may be executed as a means to mitigate the congestion and/or the predicted congestion.

Figure 3F:
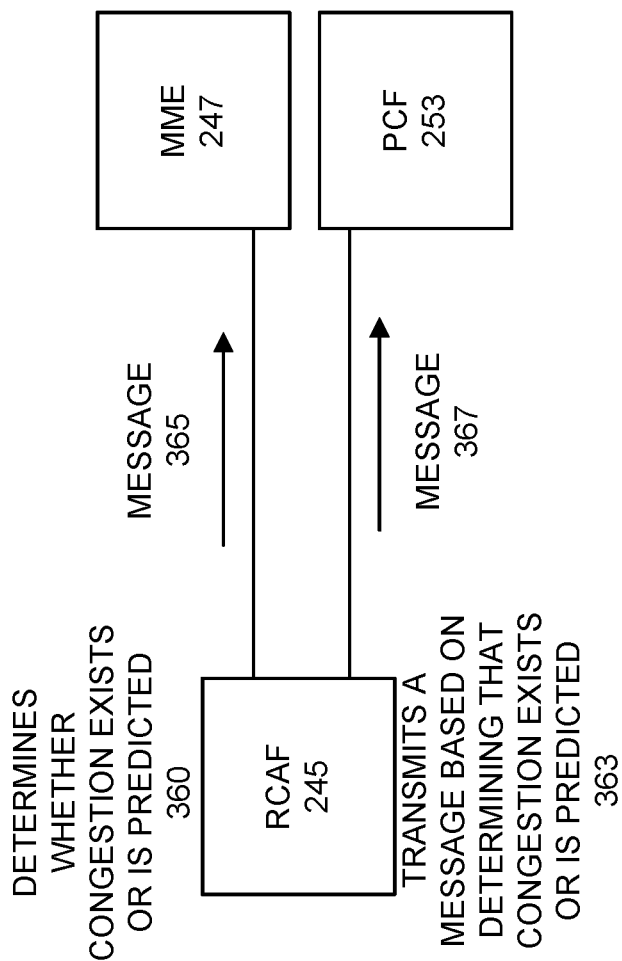

Referring to FIG. 3F, in response to receiving RAN congestion information 315 from RAN OAM 121, RCAF 245 analyzes the RAN congestion information, and determines whether congestion and/or predicted congestion exist(s) 360. According to some exemplary embodiments, RCAF 245 may obtain thresholds from network 115 to make such determinations. According to this exemplary scenario, assume that congestion and/or predicted congestion exist(s). In response, RCAF 245 transmits a message (e.g., message 365) to MME 247 and a message (e.g., message 367) to PCF 253 based on determining that congestion exists or is predicted 363.

Figure 3G:
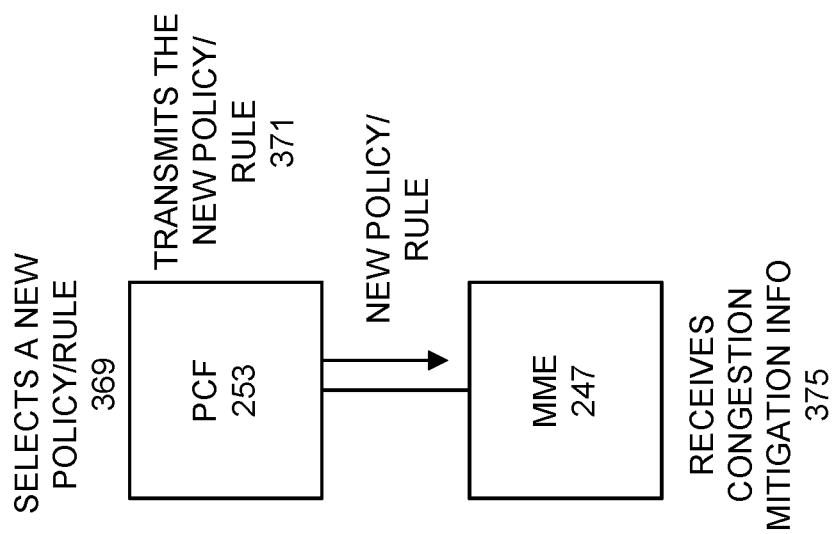

Referring to FIG. 3G, in response to receiving message 367, PCF 253 may select a new policy or a rule 369, as previously described. PCF 253 may generate and transmit the new policy or rule 371 to MME 247. As illustrated, MME 247 receives the congestion mitigation information 375 from PCF 253.

Figure 3H:
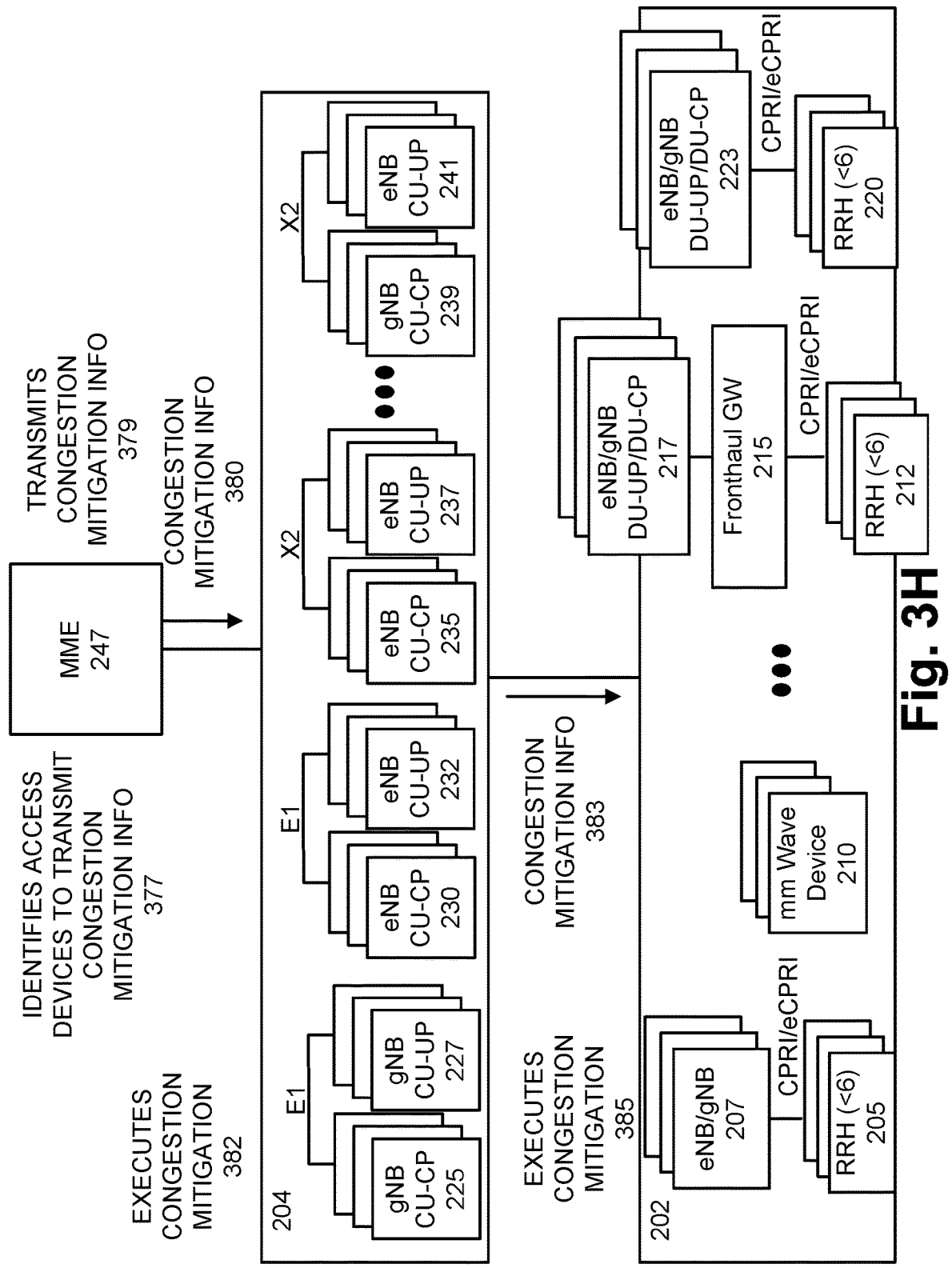

Referring to FIG. 3H, in response to receiving the congestion mitigation information, MME 247 identifies access devices 107 of the diversified RAN to which the congestion mitigation information pertains 377, and transmits the congestion mitigation information 379. In response to receiving the congestion mitigation information message 380 and congestion mitigation information message 383, access devices 107 of second layer 204 and access devices 107 of first layer 202, to which the congestion mitigation information pertains, is executed 382 and 385. According to an exemplary scenario, the congestion mitigation information includes a new policy or rule, which includes spectrum re-allocation in relation to one or multiple network devices, may be applied and enforced. For example, a RAN scheduler of access devices 107 of first layer 202 may re-allocate radio spectrum according to time and/or amount, as previously described. According to other exemplary scenarios, additional, different, or fewer measures may be executed as a means to mitigate the congestion and/or the predicted congestion.

Although FIGS. 3A-3H illustrate an exemplary process of the congestion control service, according to other exemplary embodiments, the process may include additional, different, and/or fewer steps, include additional, different, and/or fewer messages, and/or involve additional, different, and/or fewer network devices. For example, the congestion control service may include communication of congestion mitigation information, and congestion mitigation procedures being executed in response thereto, by various core devices 122 of core network 120, such as UPF 263 and/or GW-U 258. Additionally, while the exemplary process of the congestion control service may be provisioned as a closed-loop one-way system, according to other exemplary embodiments of the process, the congestion control service may be provisioned in a different type of closed-loop system or a system other than a closed-loop system.

FIG. 4 is a diagram illustrating exemplary components of a device 400 that may be included in one or more of the devices described herein. For example, device 400 may correspond to components included in network devices of access network 105, network devices in core network 120, a network device in network 125, and end device 180. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to RAN OAM 121 and other core devices 122, software 420 may include an application that, when executed by processor 410, provides the functions of the congestion control service, as described herein. Additionally, with reference to access devices 107, software 420 may include an application that, when executed by processor 410, provides the functions of the congestion control service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, spun up, spun down, etc., using well-known virtualization techniques in a public/private cloud or other type of network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
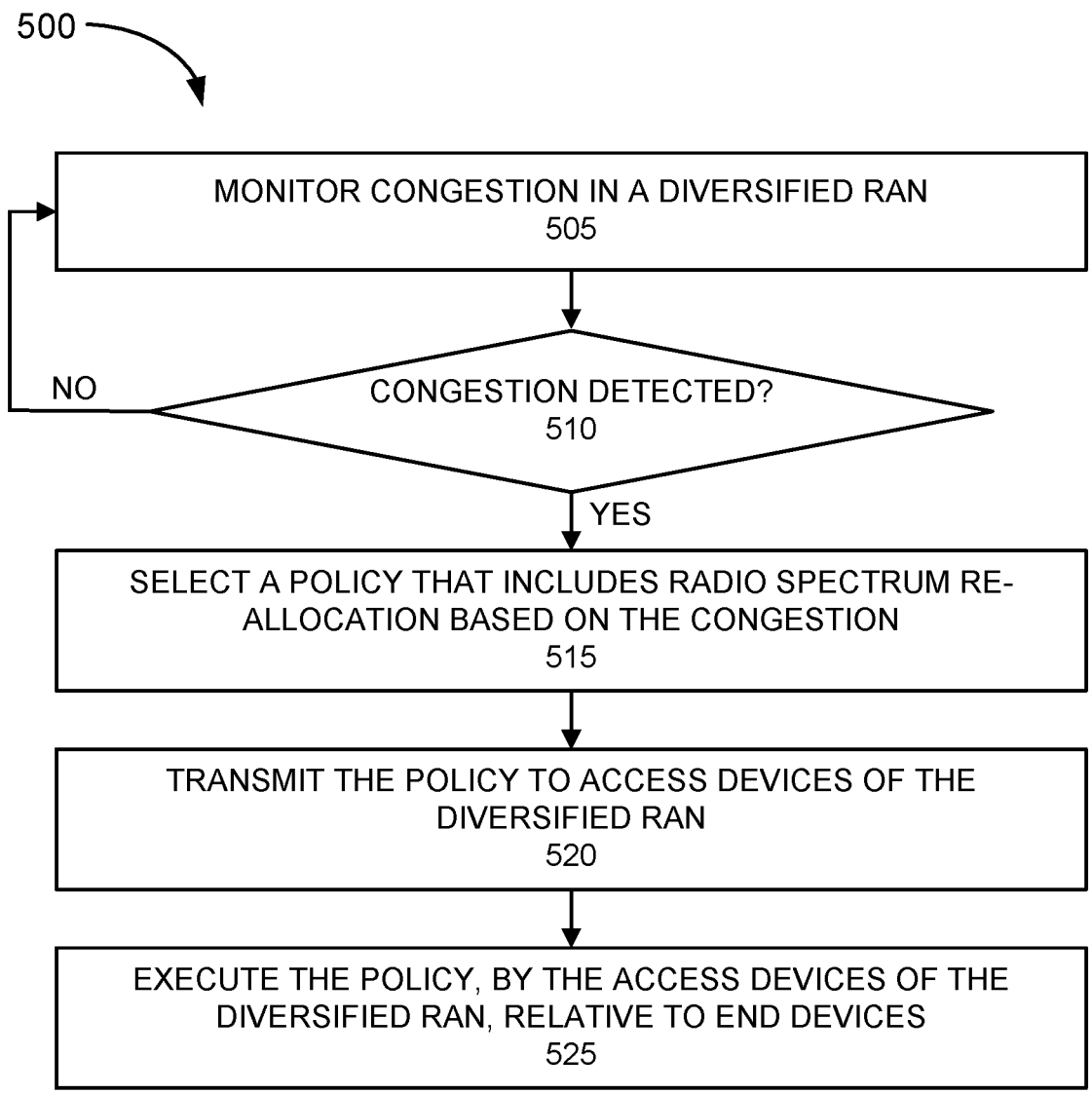
FIG. 5 is a flow diagram illustrating an exemplary process of an exemplary embodiment of the congestion control service.

FIG. 5 is a flow diagram illustrating an exemplary process 500 of an exemplary embodiment of the congestion control service. According to an exemplary embodiment, core devices 122 and access devices 107 may perform steps of process 500. For example, processor 410 executes software 420 to perform the steps illustrated in FIG. 5, and described herein. According to an exemplary embodiment, process 500 may pertain to a 4G portion (e.g., an LTE, LTE-A, LTE-A Pro portion) and/or a cm wave portion of the diversified RAN that may not include network slicing. According to other exemplary embodiments, process 500 may pertain to other portions of the diversified RAN that are defined by other characteristics (e.g., functional split, network services, etc.), as previously described.

Referring to FIG. 5, in block 505, congestion in a diversified RAN may be monitored. For example, RAN OAM 121 may obtain congestion information from various access devices 107.

In block 510, it may be determined whether congestion is detected. For example, RCAF 245 may analyze congestion information received from RAN OAM 121, and determine whether there is congestion. As previously described, RCAF 245 may compare parameters and values included in the congestion information to threshold congestion parameters and values. Based on a result of the comparison, RCAF 245 may determine whether congestion and/or predicted congestion is/are detected. Additionally, for example, RCAF 245 may determine a degree of congestion (e.g., low, medium, high, etc.) in relation to the network resource (e.g., physical, virtual, logical).

When it is determined that no congestion is detected (block 510—NO), process 500 may return to block 505. For example, RAN OAM 121 continues to receive congestion information, and no congestion mitigation measures are invoked.

When it is determined that congestion is detected (block 510—YES), a policy, which includes radio spectrum re-allocation, is selected. For example, PCF 253 may receive congestion information from RCAF 245, and PCF 253 may select the policy that correlates to the congestion information.

In block 520, the policy is transmitted to access devices of the diversified RAN. For example, MME 254 may receive the selected policy, and transmit the selected policy to appropriate access devices 107 of the diversified RAN. For example, the access devices 107 of second layer 204 may receive the selected policy, and identify the access devices 107 of first layer 202 to receive the policy. The access devices 107 of second layer 204 may transmit the policy to the identified access devices 107 of first layer 202.

In block 525, the policy is executed by the access devices of the diversified RAN relative to end devices. For example, access devices 107 may receive and execute the selected policy relative to end devices 180. The policy may pertain to currently attached end devices 180 and/or candidate end devices 180 that have to attach/camp. As previously described, for example, a scheduler or radio resource manager of access device 107 may perform a spectrum re-allocation procedure that adjusts a carrier according to time and/or amount.

Although FIG. 5 illustrates an exemplary process 500 of the congestion control service, according to other embodiments, process 500 may include additional operations, fewer operations, and/or different operations than those illustrated in FIG. 5, and described herein. As described herein, process 500 may be iteratively performed until the congestion is under control. Additionally, for example, multiple measures to reduce congestion may be performed simultaneously in conjunction with the enforcement of the selected policy/radio spectrum re-allocation.

Figure 6:
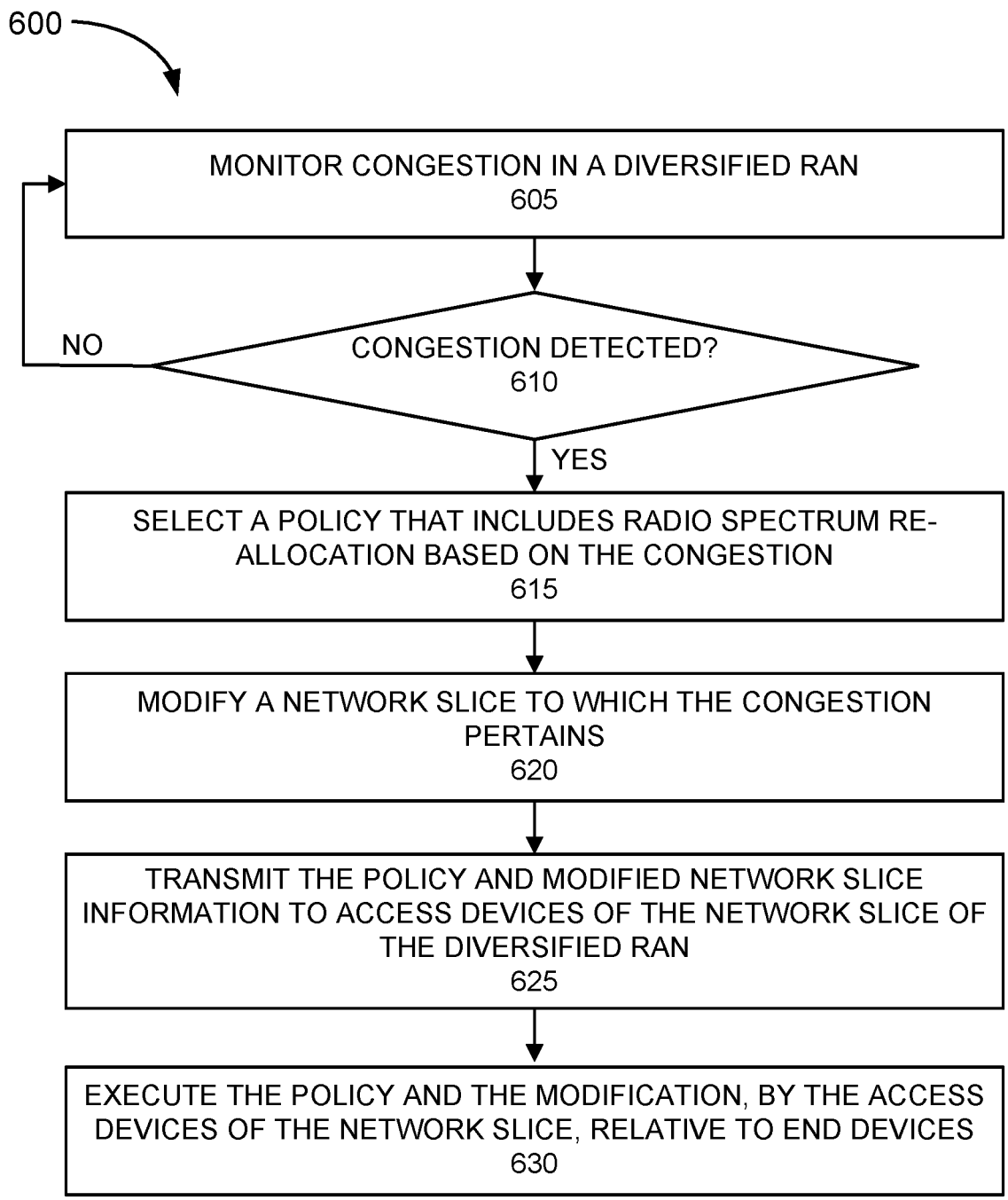
FIG. 6 is a flow diagram illustrating another exemplary process of an exemplary embodiment of the congestion control service.

FIG. 6 is a flow diagram illustrating another exemplary process 600 of an exemplary embodiment of the congestion control service. According to an exemplary embodiment, core devices 122 and access devices 107 may perform steps of process 600. For example, processor 410 executes software 420 to perform the steps illustrated in FIG. 6, and described herein. According to an exemplary embodiment, process 600 may pertain to a 5G portion (e.g., a NR portion) and/or an mm wave portion of the diversified RAN that may include network slicing. According to other exemplary embodiments, process 600 may pertain to other portions of the diversified RAN that are defined by other characteristics (e.g., functional split, network services, etc.), as previously described.

Referring to FIG. 6, in block 605, congestion in a diversified RAN may be monitored. For example, RAN OAM 121 may obtain congestion information from various access devices 107.

In block 610, it may be determined whether congestion is detected. For example, NWDAF 243 may analyze congestion information received from RAN OAM 121, and determine whether there is congestion. As previously described, NWDAF 243 may compare parameters and values included in the congestion information to threshold congestion parameters and values. Based on a result of the comparison, NWDAF 243 may determine whether congestion and/or predicted congestion is/are detected. Additionally, for example, NWDAF 243 may determine a degree of congestion (e.g., low, medium, high, etc.) in relation to the network resource (e.g., physical, virtual, logical).

When it is determined that no congestion is detected (block 610—NO), process 600 may return to block 605. For example, RAN OAM 121 continues to receive congestion information, and no congestion mitigation measures are invoked.

When it is determined that congestion is detected (block 610—YES), a policy, which includes radio spectrum re-allocation, is selected. For example, PCF 253 may receive congestion information from NWDAF 243, and PCF 253 may select the policy that correlates to the congestion information.

In block 620, a network slice configuration is modified. For example, NSSF 250 may receive congestion information from NWDAF 243. NSSF 250 may modify the network slice to which the congestion information pertains, as previously described.

In block 625, the policy and the modified network slice information is transmitted to access devices of the diversified RAN. For example, AMF 255 may receive the selected policy and the modified network slice information, and transmit the selected policy and the modified network slice information to appropriate access devices 107 of the diversified RAN. For example, the access devices 107 of second layer 204 may receive the selected policy and the modified network slice information, and identify the access devices 107 of first layer 202 to receive the policy and modified network slice information. The access devices 107 of second layer 204 may transmit the policy and the modified network slice information to the identified access devices 107 of first layer 202.

In block 630, the policy and the modified network slice is executed by the access devices of the diversified RAN relative to end devices. For example, access devices 107 may receive and execute the selected policy relative to end devices 180. The policy may pertain to currently attached end devices 180 and/or candidate end devices 180 that have to attach/camp. As previously described, for example, a scheduler (e.g., in DU-RRH) or a radio resource manager (e.g., in CU-CP/BBU) of access device 107 may perform a spectrum re-allocation procedure that adjusts a carrier according to time and/or amount. Additionally, access devices 107 of first layer 202 and second layer 204 may each modify their portion of the network slice.

Although FIG. 6 illustrates an exemplary process 600 of the congestion control service, according to other embodiments, process 600 may include additional operations, fewer operations, and/or different operations than those illustrated in FIG. 6, and described herein. As described herein, process 600 may be iteratively performed until the congestion is under control. Additionally, for example, multiple measures to reduce congestion may be performed simultaneously in conjunction with the enforcement of the selected policy/radio spectrum re-allocation.

Additionally, for example, according to other exemplary embodiments, process 600 may select a policy, but not modify a network slice, or modify the network slice and not select a new policy that provides spectrum re-allocation.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 5 and 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or spread across multiple physical memory devices associated with one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
   receiving, by a network device, congestion information from a diversified radio access network (RAN), wherein the diversified RAN includes multiple radio access technologies (RATs) and multiple types of functional splits;
   determining, by the network device, at least one of congestion or predicted congestion;
   selecting, by the network device, a policy that indicates a radio spectrum re-allocation that adjusts a sharing of a carrier bandwidth between the multiple RATs;
   transmitting, by the network device, the policy to access devices of the diversified RAN; and
   executing, by the access devices, the policy relative to traffic associated with end devices that are attached to the access devices.

2. The method of claim 1, further comprising:
   calculating, by the network device, a modification to one or more network slices of the diversified RAN to which the at least one of congestion or predicted congestion pertains; and
   transmitting, by the network device, calculated network slice modification information to the access devices.

3. The method of claim 1, wherein the multiple RATs include at least one of Long Term Evolution (LTE), LTE-Advanced, or LTE-Advanced Pro, and next generation new radio (NR).

4. The method of claim 1, wherein the multiple types of functional splits include use of F1 user plane interfaces, F1 control plane interfaces, E1 interfaces, centralized units (CUs) for control plane and user plane, and distributed units (DUs) for control plane and user plane.

5. The method of claim 1, wherein the transmitting further comprises:
   transmitting the policy to the access devices via at least one of a mobility management entity (MME) or an access and mobility management function (AMF).

6. The method of claim 1, wherein the policy further indicates adjusting the sharing of the carrier bandwidth between the multiple RATs in terms of at least one of time of use or amount of bandwidth relative to a particular end device application or service.

7. The method of claim 1, wherein the access devices include remote radio heads that communicate with the end devices in a centimeter wave radio spectrum and a millimeter wave radio spectrum.

8. The method of claim 1, further comprising:
   identifying, by the network device in response to the receiving, one or multiple attributes of the congestion information; and
   transmitting, by the network device in response to the identifying, the congestion information to a network data analytics function (NWDAF) or a RAN congestion awareness function (RCAF).

9. A system comprising:
   a processor, wherein the processor is configured to:
      receive congestion information from a diversified radio access network (RAN), wherein the diversified RAN includes multiple radio access technologies (RATs) and multiple types of functional splits;
      determine at least one of congestion or predicted congestion;
      select a policy that indicates a radio spectrum re-allocation that adjusts a sharing of a carrier bandwidth between the multiple RATs;
      transmit the policy to access devices of the diversified RAN; and
      execute the policy relative to traffic associated with end devices that are attached to the access devices.

10. The system of claim 9, wherein the processor is further configured to:
    calculate a modification to one or more network slices of the diversified RAN to which the at least one of congestion or predicted congestion pertains; and
    transmit calculated network slice modification information to the access devices.

11. The system of claim 9, wherein the multiple RATs include at least one of Long Term Evolution (LTE), LTE-Advanced, or LTE-Advanced Pro, and next generation new radio (NR).

12. The system of claim 9, wherein the multiple types of functional splits include use of F1 user plane interfaces, F1 control plane interfaces, E1 interfaces, centralized units (CUs) for control plane and user plane, and distributed units (DUs) for control plane and user plane.

13. The system of claim 9, wherein, when transmitting, the processor is further configured to:
    transmit the policy to the access devices via at least one of a mobility management entity (MME) or an access and mobility management function (AMF).

14. The system of claim 9, wherein the policy further indicates adjusting the sharing of the carrier bandwidth between the multiple RATs in terms of at least one of time of use or amount of bandwidth relative to a particular end device application or service.

15. The system of claim 9, wherein the processor is further configured to:
    identify one or multiple attributes of the congestion information; and
    transmit, in response to the identification, the congestion information to a network data analytics function (NWDAF) or a RAN congestion awareness function (RCAF).

16. A non-transitory computer-readable storage medium storing instructions executable by a processor of a system, which when executed cause the system to:
    receive congestion information from a diversified radio access network (RAN), wherein the diversified RAN includes multiple radio access technologies (RATs) and multiple types of functional splits;
    determine at least one of congestion or predicted congestion;
    select a policy that indicates a radio spectrum re-allocation that adjusts a sharing of a carrier bandwidth between the multiple RATs;
    transmit the policy to access devices of the diversified RAN; and execute the policy relative to traffic associated with end devices that are attached to the access devices.

17. The non-transitory computer-readable storage medium of claim 16, wherein the instructions further include instructions executable by the processor of the system, which when executed cause the system to:
calculate a modification to one or more network slices of the diversified RAN to which the at least one of congestion or predicted congestion pertains; and
transmit calculated network slice modification information to the access devices.

18. The non-transitory computer-readable storage medium of claim 16, wherein the multiple RATs include at least one of Long Term Evolution (LTE), LTE-Advanced, or LTE-Advanced Pro, and next generation new radio (NR).

19. The non-transitory computer-readable storage medium of claim 16, wherein the multiple types of functional splits include use of F1 user plane interfaces, F1 control plane interfaces, E1 interfaces, centralized units (CUs) for control plane and user plane, and distributed units (DUs) for control plane and user plane.

20. The non-transitory computer-readable storage medium of claim 16, wherein the instructions to transmit further include instructions executable by the processor of the system, which when executed cause the system to:
transmit the policy to the access devices via at least one of a mobility management entity (MME) or an access and mobility management function (AMF).

* * * * *